July 23, 1968　　　　　F. W. HILL　　　　　3,394,344
TRAFFIC SAMPLING CONTROLLER SYSTEMS
Original Filed June 15, 1959　　　　　　　　5 Sheets-Sheet 1
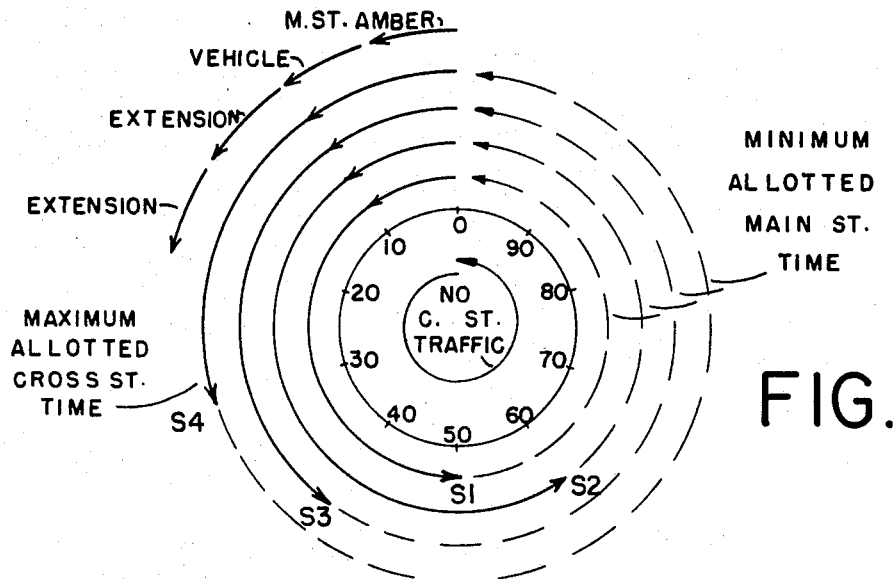
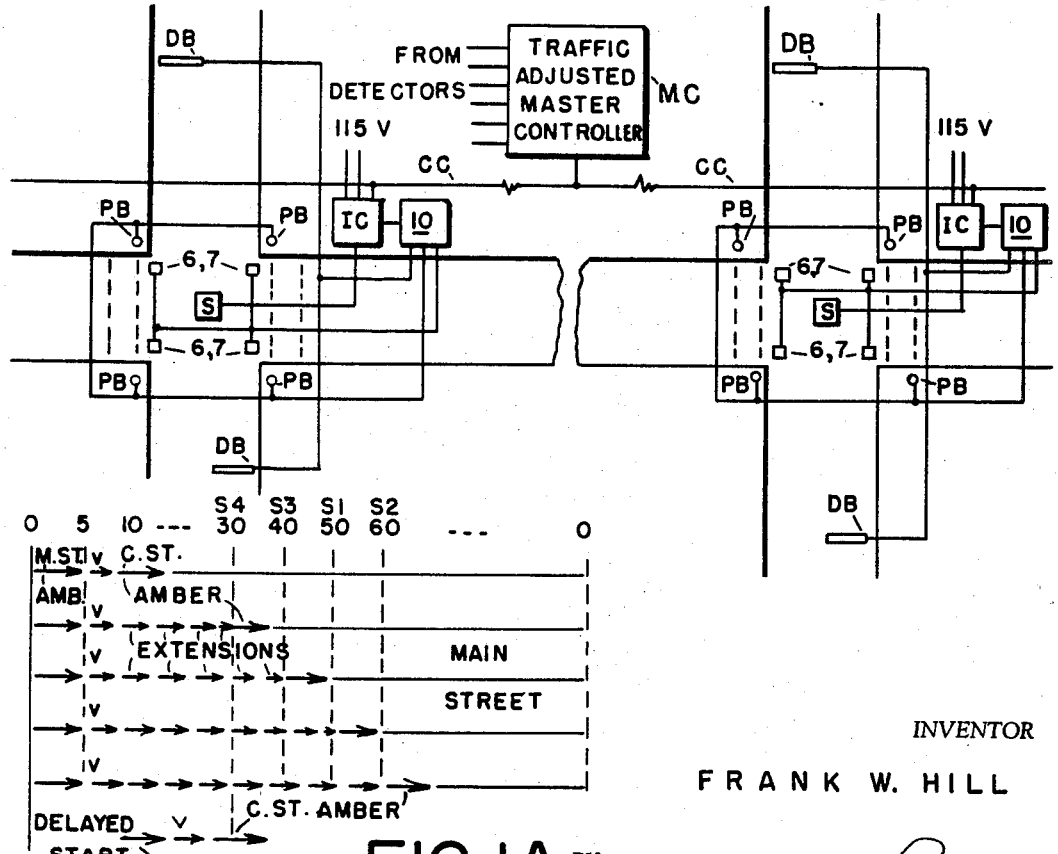
INVENTOR
FRANK W. HILL
BY Bruno C. Lechler
ATTORNEY July 23, 1968  F. W. HILL  3,394,344
TRAFFIC SAMPLING CONTROLLER SYSTEMS
Original Filed June 15, 1959  5 Sheets-Sheet 2

INVENTOR
FRANK W. HILL
BY Bruno Lechler
ATTORNEY

INVENTOR
FRANK W. HILL

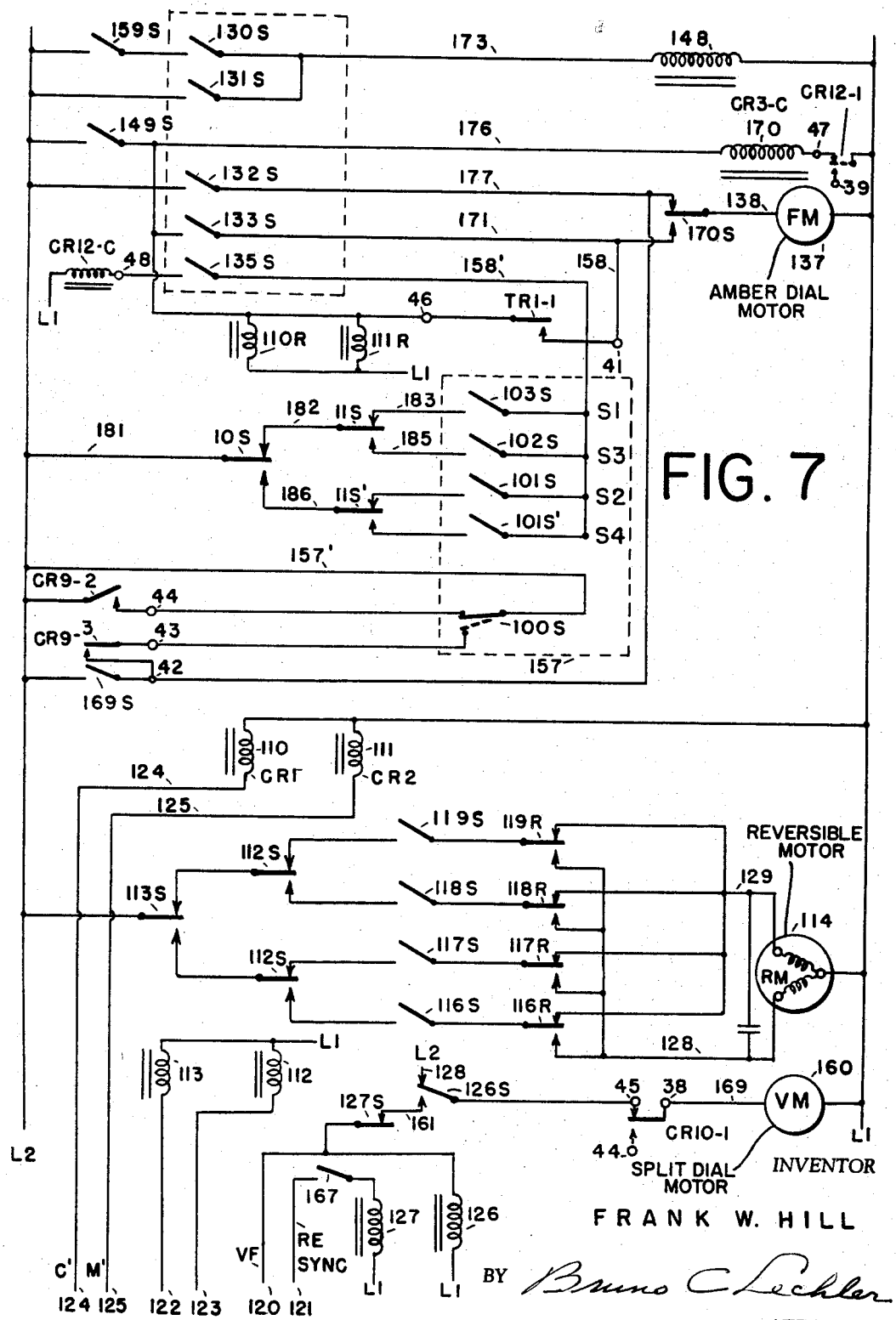

United States Patent Office 3,394,344
Patented July 23, 1968

3,394,344
TRAFFIC SAMPLING CONTROLLER SYSTEMS
Frank W. Hill, Moline, Ill., assignor to E. W. Bliss Company, Canton, Ohio, a corporation of Delaware
Continuation of abandoned application Ser. No. 384,019, June 29, 1964, which is a continuation of application Ser. No. 820,215, June 15, 1959. This application Oct. 22, 1965, Ser. No. 513,609
4 Claims. (Cl. 340—35)

ABSTRACT OF THE DISCLOSURE

A semiactuated local traffic controller which serves during each traffic signal cycle to allot a maximum potential cross street right-of-way interval and a minimum main street right-of-way interval. The local controller includes cycle length and offset control circuits which respectively respond to cycle length determining signals and offset determining signals received from a master controller for controlling both the duration of the cycle length as well as the offset relationship of the traffic cycle of the local controller relative to the master controller. The local controller also includes a split control circuit for receiving split determining signals from the master controller for purposes of changing the cycle split between the minimum main street right-of-way interval and the allotted maximum potential cross street right-of-way interval. In this manner, the duration of the allotted maximum cross street potential right-of-way interval may be changed in accordance with a changed cycle length split independently of changes in the duration of the cycle length or changes in the offset relationship. The semiactuated local controller also includes a split dial carrying a key for actuating a switching means once during each traffic signal cycle for starting an actual cross street allotted interval providing that a vehicle detection has also occurred. To permit a late arriving vehicle to be given a right-of-way interval during the alloted potential cross street interval, a plurality of keys, or a single key having a trailing edge, is provided for providing an extended period during each traffic signal cycle in which the key, or keys, may actuate a switch, providing a detection has occurred, for allocating a cross street right-of-way interval.

This invention relates to vehicular traffic signal controllers which are controlled as to cycle length, split and offset from a traffic adjusted master controller and which are adjusted to traffic conditions at the intersection by local traffic actuation.

This application is a continuing application of my previous application, Ser. No. 820,215, filed June 15, 1959, now abandoned, and application, Ser. No. 384,019, filed June 29, 1964 and now abandoned.

In particular, the invention contemplates major adjustment of the various intervals of the traffic signal cycle according to the flow of traffic within the system, and minor adjustment of portions of the cycle according to the flow of pedestrian and vehicular traffic at the intersection.

From one aspect, the invention relates to auxiliary timing apparatus adapted to exercise minor control of an intersection controller which is part of an integrated traffic control system supervised and adjusted from a master controller of the traffic sampling and computing type.

From another aspect, the invention relates to auxiliary apparatus adapted to convert the operation of a pretimed controller to semi-actuated operation. The pretimed controller may preferably be of the type adjusted by a traffic sampling master controller as to cycle length, split, and offset. The pretimed controller may also be adjusted by a programming type master or by any combination of traffic sampling and programming master.

From a third aspect, the invention relates to improvements in intersection controllers to permit them to cooperate with the auxiliary timing and control apparatus to call in the cross street phase upon vehicle actuation and to permit extension of the cross street phase with continued actuation until the start of the allotted main street period, and upon pedestrain actuation to permit the insertion of a pedestrian walk interval and guaranteed clearance interval at the proper time in the cycle.

Thus, the intersection controller disclosed herein has major adjustments made in its cycle of operation by a master controller and has minor adjustments made within its cycle by an auxiliary timer upon local pedestrian or vehicle actuation.

It is already known to provide a group of intersection controllers and a traffic sampling master controller having means at each local controller to vary the traffic cycle length, to vary the delay of the green to produce a progressive effect along the highway, and to vary the proportion of main street to cross street right of way time. It is also known to provide an intersection controller having traffic actuable means to award right of way to one or another street in proportion to traffic thereon. What is believed to be new is to provide a plurality of local intersection controllers which respondy to local vehicle and pedestrian actuation within the framework of a pattern of operation set by the master controller in response to traffic sampling over the entire system.

Previous systems employing master controlled means to coordinate the start of the cross street green at successive intersections along a highway employed a permissive impulse or a preventive impulse. The permissive impulse was normally transmitted once each traffic cycle to permit the local intersection controller to award right of way to cross street traffic after a detector actuation. An example of this system is shown in Patent No. 2,110,723.

The preventive "impulse" was normally a continuous current interrupted for a time once each traffic cycle to permit the local intersection controller to grant right of way to its cross street if traffic had actuated a detector thereon. An example of this system is found in Patent 2,241,047. This system had the further refinement of forcing the controller to return to the main street right of way indication at least as early as the allotted time, thus enabling the controller to answer cross street calls later in the cross street allotted time and still get back to main street in time to maintain progression. This was accomplished by initiating the preventive impulse earlier than the start of the alloted main street interval by a time equal to the sum of one cross street initial interval, one vehicle extension interval, and the amber interval.

Each of these systems requires an individual control conductor to each semi-actuated local intersection controller. Two conductors are required for each full actuated controller. If fifty controllers were used in an interconnected system, fifty or more control conductors would be required to control the local controllers, depending on how many were full actuated conductors. This is in addition to the control conductors required for other features. The invention eliminates the need for individual permissive or preventive control conductors and makes use of an existing timing dial in each intersection controller to control the time at which the controller may answer vehicle actuations on the cross street. The operation of the timing dial is controlled by the cycle length, split, and offset control conductors through a multiplicity of control conditions.

In addition to reducing the number of control conductors required, the invention improves the efficiency of control of the intersections. The invention (1) permits each local controller to answer traffic actuations during a greater portion of each traffic cycle, and (2) permits continued actuations to hold the cross street right of way for a greater portion of the cycle depending on the "split" called for by the master.

With respect to the first advantage, in a coordinated system semi-actuated local controllers are permitted to give the right of way signal indication to cross street traffic only during an "allotted" time which generally corresponds to the cross street interval in a pretimed system. The allotted time normally is started later at successive intersections to provide progression. In known systems employing preventive or permissive impulses, the impulse appears at each local controller at the beginning of the "allotted" cross steet interval. If no traffic actuation has occurred prior to the impulse or during the impulse, no cross street right of way signal is displayed. The invention permits the controller to insert a cross street right of way interval for a substantial time after the beginning of the allotted time. The timer need be set to provide only a cross street minimum interval before it must return the right of way to the main street. This allows the controller to pass one or more vehicles on cross street if they arrive after the beginning of the allotted cross street interval. Thus they are not detained an entire cycle which may, for example, be from 60 to 100 seconds.

With respect to the second named advantage, the maximum cross street right of way interval is varied throughout the day to permit the cross street interval to correspond to the "split" called for by the master controller. It is well known that the division of the traffic signal cycle between main street and cross street is made to vary throughout the day by programmed or traffic adjusted means to correspond with anticipated or measured traffic conditions. The invention varies the allotted cross street interval in exact relationship with the split called for by the master. Thus, when the master controller senses that the ratio of cross street to main street traffic is high, it calls for a split of the cycle advantageous to cross street traffic. The local controller then permits a longer cross street allotted interval. Cross street traffic can then receive right of way during a greater portion of the cycle. This is particularly helpful when cross street traffic is heavy.

Thus, the auxiliary apparatus of the present invention is arranged to permit the intersection controller to operate as a vehicle actuated and a pedestrian actuated controller. The intersection controller may preferably be of the type disclosed in United States Patent No. 3,133,264 which is designed to provide, under direction of a master controller, a traffic signal cycle variable as to duration, as to offset, and as to split. Duration is defined as the time in seconds from the beginning of the main street green signal until the next beginning of the main street green signal. Offset is defined as the delay of the start of the cycle at an intersection with respect to the start of the cycle at a master intersection. The delay is usually expressed in percent of a cycle. Split is defined as the percent division of the cycle to main street and to cross street. The auxiliary apparatus disclosed herein is arranged to insert an ex-tendable vehicle phase and a two period pedestrian phase at the proper time within the cycle to maintain progression (offset), split, and cycle length. The apparatus thus converts a controller from pretimed operation to vehicle and pedestrian actuated operation.

In operation the intersection may be made to dwell with the main street right of way signals and the cross street stop signals illuminated. When a cross street vehicle or pedestrian actuation occurs near the beginning of the time allotted to the cross street movement the right of way is given to the cross street and to the pedestrian movement. Continued vehicle actuation extends the cross street movement. Continuous actuation cannot hold the cross street right of way past the beginning of the main street movement but operates a memory circuit to call in the cross street movement during the next cycle.

If the actuation occurs prior to the time allotted to the cross street movement, the call is remembered and right of way given when the allotted time arrives.

The right of way periods to both main street and cross street are timed by a rotating dial in the intersection controller. As a limiting condition, with continuous actuation of the cross street detectors, the dial would time a maximum interval to cross street traffic and a minimum interval to main street traffic. With fewer actuations, the cross street interval would be shortened and the main street interval lengthened. That is, all surplus time is awarded to main street. With only a single actuation cross street traffic gets a minimum time and main street traffic gets maximum time—the remainder. With no actuations, cross street gets no time and main street traffic gets continuous right of way.

There are six possible selections of maximum cross street and minimum main street timings in the preferred form of the invention. These correspond to six cycle lengths and are selected at the master controller according to the volume of traffic within the system at any time and are put into effect at every intersection controller through an interconnecting circuit. When the volume of traffic is high, a long cycle is put into effect to reduce the number of starts and stops traffic must make at signalized intersections. When the volume of traffic is low, a short cycle is effected to reduce the time vehicles must wait at an intersection until the signals change. At volumes between light and heavy, the cycle length is varied proportionally. Known systems are likewise able to vary cycle length in proportion to traffic volume but no known system varies the duration of the maximum allotted cross street interval proportional to cycle length. Prior systems have a maximum allotted cross street interval of constant duration, regardless of cycle length. This penalizes cross street traffic when volume is high precisely when a longer cross street maximum interval is required.

There are four possible selections of cross street maximum timings. These correspond to the four splits and are selected at the master controller according to the ratio of main street to cross street traffic within the system and are put into effect at each intersection controller through interconnecting circuits. When cross street traffic is heavy with respect to main street traffic, a split favoring cross street is put into effect at each local controller by the master controller. Under the limiting condition of substantially continuous actuation of the cross street detectors, a longer maximum time is allowed cross street traffic. Prior controllers made no provision for variable splits of this nature.

There are also four possible selections of initiating time of the allotted cross street interval. These correspond to the four offsets and are chosen by the master controller according to the ratio of inbound to outbound traffic volumes, and are put into effect at each intersection controller through common interconnecting circuits. The offset mechanism in each intersection controller displaces the start of the cycle at each controller a preset percent from the master controller. The percent displacements are preset a different amount at each controller according to a traffic flow plan to provide proper progression under the various traffic conditions. If a traffic actuation occurs near the beginning of the cross street allotted time, the intersection controller awards the right of way to cross street traffic almost immediately. If an actuation occurs at any other part of the cycle, the intersection controller delays the award of right of way to cross street traffic until it least disturbs progression on the main street. Prior systems permitted local controllers to respond or not to respond to cross street actuation, but, to my knowledge, no system permits an intersection controller to respond to actuations at a selected one of a plurality of offsets.

The present invention is directed toward a traffic control system including a master controller and a plurality of local controllers which are at least partially controlled by the master controller which provides cycle length offset and split determining signals. More particularly, the present invention is directed toward an improvement wherein each local controller takes the form of a semi-actuated local controller for normally allocating right of way to main street traffic movement and denying right of way to intersecting cross street traffic movement in the absence of detection of cross street traffic intending movement through the intersection. The local controller itself serves during each traffic cycle to allot a maximum potential cross street right of way interval, and a minimum main street right of way interval, and comprises: first means, such as a variable frequency motor, responsive to the cycle length determining signals for purposes of changing the duration of the cycle length of the traffic cycle; second means, such as a relay, responsive to the offset determining signals for changing the offset relationship of the traffic cycle of the local controller relative to the master controller; and, third means, such as a relay, independent from the first and second means and responsive to the split determining signals for changing the cycle length split of the minimum main street right of way interval and the allotted maximum potential cross street right of way interval, so that the duration of the allotted maximum cross street potential right of way interval may be changed in accordance with changed cycle length split independently of changes in the duration of the cycle length or changes in the offset relationship.

In accordance with another aspect of the present invention, the semi-actuated local controller includes: means, such as a variable frequency motor, for timing the cycle length of operation of the controller, with each traffic cycle including a maximum potential cross street allotted interval and a minimum main street allotted interval; means such as switches, for purposes of establishing within each traffic cycle determination of the potential cross street allotted interval; detection means, such as a relay, energized in response to the detection of cross street traffic intending movement through the intersection; holding means, such as a relay contact, responsive to the energization of the detection means for maintaining energization thereof when the energization occurs during the main street allotted interval; a first switching means taking the form of, for example, a switch closed in response to energization of the detection means; second switching means normally momentarily closed once each traffic cycle for starting the potential cross street allotted interval, whereupon the holding means will become disabled; means, such as a motor, energized in response to a closed condition of both the first and second switching means for purposes of terminating the main street right of way interval and allocating a cross street right of way interval within the maximum potential cross street allotted interval; and, means, such as a plurality of keys mounted on a rotating dial, for purposes of extending the period during each traffic cycle that the second switching means is closed, whereby cross street traffic detected after the starting of said allotted potential cross street interval may be allocated a right of way interval during the allotted potential cross street interval.

The principal object of the invention is to provide auxiliary timing and control apparatus which permits a pretimed traffic signal controller to be operated as a semi-actuated controller.

Another object is to provide apparatus which permits a pretimed controller to respond to traffic actuation and time right of way intervals within a pattern controlled by a traffic sampling master controller.

Another object is to provide an intersection controller having a traffic signal cycle adjusted both by local traffic conditions and by system traffic conditions.

Another object is to provide auxiliary apparatus which will operate in conjunction with a local traffic signal controller to time the additional intervals required.

Another object is to provide apparatus which upon actuation will time a pedestrian walk interval and a guaranteed clearance interval within the allotted cross street portion of the cycle.

Another object is to provide auxiliary apparatus operative in conjunction with an intersection controller which will provide, as a limiting condition, a cross street interval proportional to traffic volume, proportional to the ratio of cross street to main street traffic volumes, and at an offset relative to the ratio of inbound to outbound traffic volumes.

Another object is to provide apparatus which will permit auxiliary apparatus to respond to a detector actuation occurring a substantial time after the start of an allotted cross street interval.

Another object is to provide apparatus which will time the termination of an allotted cross street interval in accurate relationship with the split of the cycle established by the master controller.

The auxiliary apparatus disclosed herein will be described as operating in conjunction with an intersection traffic signal controller of the type shown in United States Patent No. 3,133,264, entitled Multiple Program Traffic Control Systems.

The intersection controller is of the type which may have its cycle length, split, and offset adjusted by a master controller of the traffic sampling and computing type. One such master controller is shown in United States Patent No. 3,120,651, entitled, Traffic Adjusted Traffic Control Systems.

The invention comprises auxiliary timing and control apparatus which will cause a controller of the type shown in Patent No. 3,133,264, named above, to operate as a vehicle actuated controller within certain portions of its master-adjusted cycle.

A few modifications are required in the standard intersection controller to permit it to operate in conjunction with the auxiliary apparatus. Structural modifications and wiring changes are preferably made at the time of manufacture and the unit so designated. However, a conventional unit may be converted in the field to make it agree with the wiring diagram shown in FIGURE 7 below.

The invention will be described with reference to the following drawings, of which:

FIGURE 1 is a polar diagram of the pattern of control effected by the intersection controller and the auxiliary unit.

FIGURE 1A is a linear diagram of the pattern of vehicle actuated intervals timed by the auxiliary unit.

FIGURE 2 is a diagram showing the auxiliary units connected to intersection controllers which are interconnected to a master controller.

FIGURE 7 is a wiring diagram of an intersection traffic signal controller.

*Control pattern*

Figure 6:
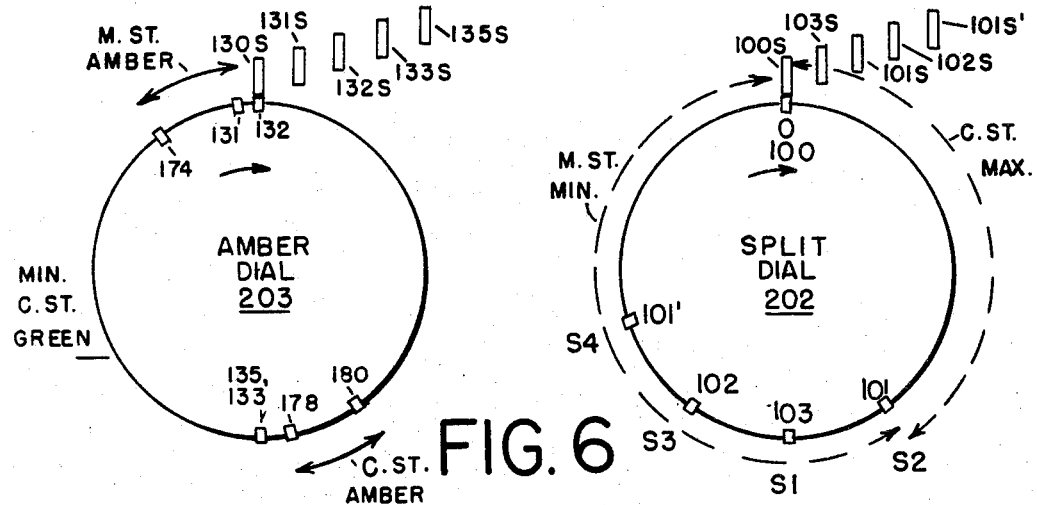
FIGURE 6 is a diagram of a portion of one type of intersection controller.

FIGURES 1 and 1A show the pattern of control effected by the auxiliary unit in combination with the intersection controller and the master controller. The maximum allotted cross street portion of the cycle may be considered to start at zero (0) and time until the effective one of the splits S1–S4 is reached. Then the minimum allotted main street interval starts and runs until zero (0). All or part of the first portion of the cycle may be allotted to cross street traffic depending upon the demands of cross street traffic. If there is no cross street traffic the right of way remains with the main street. If only one or a few vehicles appear on the cross street, one vehicle interval is allowed for the first vehicle and one extension interval is allowed for each vehicle actuating the detector during the cross street right of way interval. Any remaining time is allotted to the main street. If a sufficient number of vehicles arrive on the cross street to consume the entire cross street allotted interval, they will hold the right of way on the cross street until the effective one of the splits S1–S4 arrives. Then the right of way will revert to main street in time for proper progression. If one or more vehicles are left waiting, the cross street right of way indication is given again the next cycle. Each of the above conditions is illustrated in FIGURES 1 and 1A.

FIGURE 1A shows in straight line diagram how the time allotted to cross street traffic varies with the split of the cycle and with the number of detector actuations occurring. The top line shows the signal display after a single actuation: a main street amber interval, a vehicle interval, and a cross street amber interval. The main street amber interval starts at zero and the cross street amber interval starts well before the split S4.

The second line shows the signal display after more than one actuation during the allotted cross street portion of the cycle while split S4 is effective. Note that the fourth extension interval is interrupted by split S4 and the cross street amber interval is started.

The third line shows the signal display after a plurality of vehicle actuations during the cross street right of way interval while split S3 is effective. The fourth and fifth lines indicate the signal display with continuous cross street actuation during the cross street interval while splits S1 and S2 are effective.

The sixth line indicates the signal display which results when a single vehicle actuates the detector shortly after the allotted cross street interval has started. The vehicle need not wait through an entire traffic cycle but is given the right of way immediately after the main street amber interval is timed. As a limitation, the main street amber interval and a vehicle interval must be completed before the time allotted for the shortest split.

The change of offset and the change of cycle length is not shown in FIGURES 1 and 1A. The change in offset may be readily illustrated as shifting the entire diagram of FIGURE 1A to the left or right so that the zero line of the diagram is displaced from the zero line at the master controller by a percentage of the cycle equal to the "offset." The change in cycle length may be illustrated as expanding or compressing the diagram from the zero line.

Thus, the auxiliary unit determines whether or not the cross street right of way indication will appear during the allotted interval. It also times its duration up to a maximum interval. The intersection controller determines when the allotted interval will start and also determines its maximum duration. When the allotted interval is to start is determined by two functions: the split of the cycle and the offset of the cycle. If split S1 is in effect, for example, the allotted cross street interval terminates at point S1 on the chart. This represents a 50–50 split, main street to cross street. If split S4 is in effect, the allotted cross street interval terminates at point S4 on the chart. This represents a 70–30 split, main street to cross street.

The zero point in the cycle begins at a time offset with respect to a zero point established by the master controller and is made to vary with traffic conditions along the thoroughfare as sampled by the master controller. The duration of the cycle is also made to vary with traffic conditions on the thoroughfare and on one or more intersecting streets.

*Connection*

The preferred method of connecting the auxiliary units into the system comprised of a master controller and a plurality of intersection controllers is shown in FIGURE 2. An auxiliary unit is connected into each intersection controller when it is desired to convert to semi-actuated operation.

A traffic adjusted master controller MC receives traffic data from a number of traffic detectors located throughout the system and converts this data to a form usable for determining the most effective combination of traffic cycle length, split, and offset. Such a master controller is shown in United States patent application 778,199.

The master controller MC then makes the proper cycle length, split, and offset effective at each intersection controller IC through a control cable CC or a single channel means. Two forms of single channel control means are shown in United States Patents 2,826,752 and 2,832,060.

At the street intersections at which it is desired to permit pedestrians to initiate a pedestrian phase or cross street vehicles to initiate a cross street phase, an auxiliary control and timer unit 10 is installed. The unit 10 is interconnected with the intersection controller IC and with the pedestrian push buttons PB and/or cross street vehicle detectors DB.

The intersection traffic signals S are controlled by the intersection controller IC under the influence of the master controller MC and the auxiliary unit 10. The pedestrian WALK-WAIT signals 6, 7 are controlled by the auxiliary unit 10. Power is supplied to the intersection controller IC from a local 115 volt, 60 cycle AC source. Power is supplied to the auxiliary unit 10 from the intersection controller IC.

*Auxiliary unit*

Figure 3:
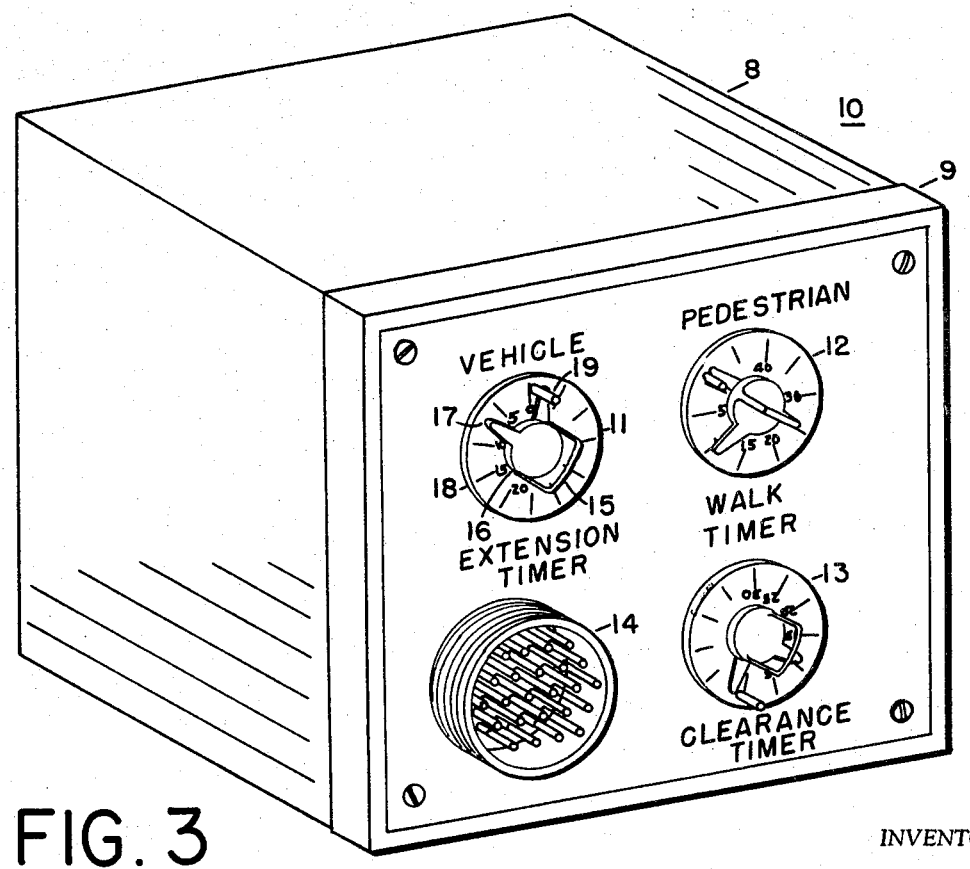
FIGURE 3 is a perspective view of the auxiliary timer and control unit.

In FIGURE 3, the auxiliary timer unit is generally indicated at 10. A sheet metal case 8 and a front cover 9 house the unit. The front cover 9 supports three timer dials 11, 12, 13 and a connector plug 14. Timer dial 11 controls the duration of the vehicle interval and the unit extension interval. Timer dial 12 controls the duration of the pedestrian walk interval and dial 13 controls the duration of the guaranteed clearance interval. Dials 12 and 13 may be connected to control the duration of other vehicular intervals rather than pedestrian intervals.

Each timer dial has an adjustment bail 15 which when pulled outward and rotated permits setting the delay interval. Bail 15 is supported on a hub 16 having an integrally formed pointer 17. A scale 18 having a pin 19 at its zero position indicates the setting of the duration of the delay interval.

The setting and the operation of the timers 11, 12, 13 will be described in greater detail when the function of the unit is explained.

The auxiliary timing unit 10 is interconnected with the intersection controller through terminal facilities located in the controller cabinet at the intersection. A multi-conductor harness is permanently connected to the proper terminals within the cabinet and to a source of power. The harness is provided with a socket adapted to be plugged into the connector plug 14. Thus the auxiliary unit may be easily disconnected and a replacement substituted for maintenance purposes.

Figure 4:
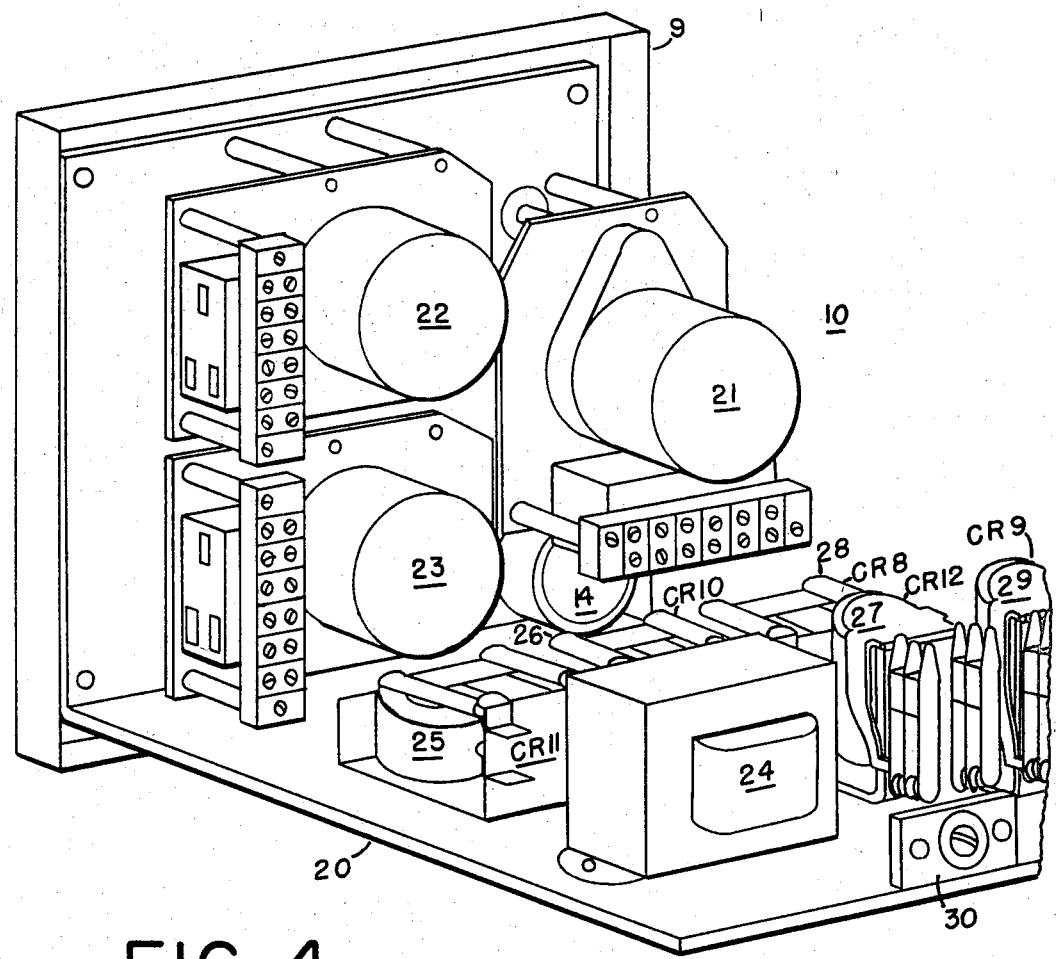
FIGURE 4 is a perspective view of the interior of the auxiliary unit.

The timing and switching apparatus within the auxiliary unit 10 is shown in perspective in FIGURE 4. The wiring is omitted for clarity. The front cover 9 supports a large angle frame 20. Timers 21, 22, 23 are mounted on the vertical portion of the angle. Transformer 24 and relays 25-29 are mounted on the horizontal portion of the angle. A locking device 30 serves to lock the mechanism 10 within the case 8.

Each timer 21, 22, 23 is of the type shown in United States Patent 2,352,449, entitled Timing Mechanism. It is obvious that other types of timers including electronic timing circuits could be employed. The mechanical operation of the timing mechanism is described completely in the above named patent and will not be repeated here.

*Intersection controller*

Figure 5:
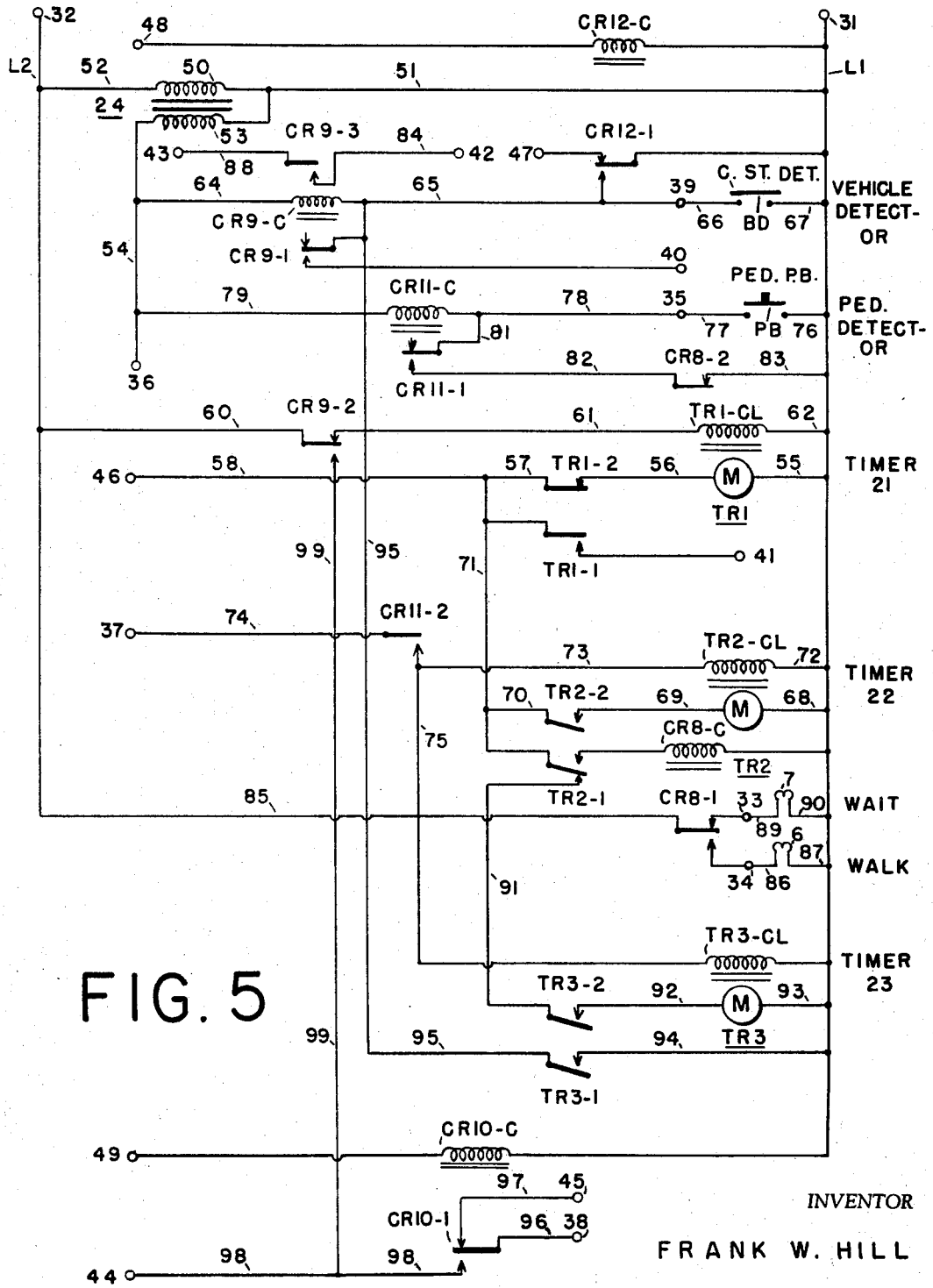
FIGURE 5 is a line to line wiring diagram of the auxiliary timer unit.

The components within the intersection traffic signal controller are described in United States Patent application 642,469, named above, and are illustrated in FIGURES 1 and 2 of that application. The components have been improved as shown in patent application 768,193, filed Oct. 20, 1958, entitled Traffic Cycle Offset Selector and in Patent 3,047,838, entitled Traffic Cycle Length Selector. The local controller traffic cycle offset apparatus is illustrated in FIGURE 5 of the former application and the local controller cycle length and split determining apparatus is shown in FIGURE 6 of the latter application. The physical configuration of this equipment is not important to the present invention and is therefore not illustrated here. The circuit configuration is important to the present invention and is shown in FIGURE 7 of the present application. The method used by the above local controllers to effect control of cycle length, split, and offset is illustrated in FIGURE 6 of the present application.

*Auxiliary circuit*

The circuit diagram for the auxiliary timing and control unit is shown in line to line form in FIGURE 5. All connections to the auxiliary unit 10 are made through pins or line terminals 31-49 in the connector plug 14.

Power is supplied to the unit through terminals 31 and 32 to lines L1 and L2, respectively, between which the primary winding 50 of transformer 24 is connected through leads 51, 52, respectively. Its secondary winding 53 has one end connected to L1 line 51; its other end supplies relay coils CR9-C and CR11-C with low voltage power through line 54. Relay CR9 is the vehicle detector actuated relay represented at 29 in FIGURE 4. Relay CR11 is the pedestrian pushbutton actuated relay shown at 25 in FIGURE 4. Low voltage power is also supplied to terminal 36 and is available for other uses outside unit 10.

The three electro-mechanical timers 21, 22, 23 shown in FIGURE 4 are represented electrically in FIGURE 5. Timer 21 is comprised of a synchronous motor M connected to line L1 through line 55 and to terminal 46 through line 56, contacts TR1-2, and lines 57 and 58. L2 power is applied to terminal 46 during each cross street green interval by a cam controlled contact 149S in the intersection controller shown in FIGURE 7. Switch TR1-2 located between lines 56 and 57 is operated by the timer mechanism at the end of the delay interval and serves to disconnect motor M from L2 power after timer TR1 times out.

Timer TR1 times the duration of the unit extension interval. It has a clutch mechanism actuated by a clutch coil TR1-CL. The time delay interval starts each time the clutch coil TR1-CL is energized. The circuit includes line L2, line 60, contacts CR9-2, line 61, clutch coil TR1-CL, line 62, and line L1. Each time the cross street vehicle detector DB is closed, the detector memory relay coil CR9-C is energized and contacts CR9-2 are transferred. Cross street traffic is given a unit extension interval after each detector actuation during the right of way period up to a preset limit equal to the cross street allotted interval. The circuit to the detector memory relay coil CR9-C includes low voltage line 54, line 64, relay coil CR9-C, line 65, terminal 39, line 66, detector DB, line 67, and line L1.

Timers TR2 and TR3 are associated with the pedestrian movement. Timer TR2, represented at 22 on FIGURE 4, has a dial 12 shown on FIGURE 3, on which the duration of the pedestrian walk interval is set. Timer TR3, represented at 23 in FIGURE 4, has a dial 13 shown also on FIGURE 3, on which duration of the guaranteed pedestrian clearance interval is set.

Timer TR2 is driven by a synchronous motor M connected to line L1 through line 68 and to terminal 46 through line 69, contacts TR2-2, line 70, line 71, and line 58. L2 power is applied to terminal 46 during each cross street green interval by the cam controlled contact 149S (see FIGURE 7) mentioned previously. Switch contacts TR2-2 are controlled by timer TR2 and are opened by the timer mechanism at the end of the delay interval to disconnect motor M and prevent it from overdriving and damaging the timing mechanism. Contacts TR2-2 are shown open because timer TR2 is normally in the timed out condition.

Timer TR2 has a clutch mechanism, actuated by clutch coil TR2-CL, of the reverse acting type as described in Patent 2,352,449 named above. For the pedestrian interval to start timing it is necessary that the clutch coil be energized to permit the timer to reset and then de-energize. Timing starts when the coil is de-energized. Clutch coil TR2-CL is connected to line L1 through line 72, and to termianl 37 through line 73, relay contacts CR11-2, and line 74. Power is applied to terminal 37 during each cross street red interval by the cross street red signal. Power does not reach clutch coil TR2-CL until relay contacts CR11-2 are closed subsequent to pedestrian pushbutton actuation.

Momentary actuation of pedestrian pushbutton PB applies low voltage power to the pedestrian detector relay coil CR11-C through lines 51, L1, 76, contacts PB, line 77, terminal 35, and lines 78, 79 and 54 from low voltage transformer winding 53. The detector memory relay coil CR11-C is maintained energized through now-closed relay contacts CR11-1 and contacts CR8-2. The holding circuit includes line 81, now-closed contacts CR11-1, line 82, contacts CR8-2, line 83, and line L1.

Thus, when the contacts CR11-2 close pedestrian pushbutton PB is depressed, pedestrian detector relay coil CR11-C will be energized. Contacts CR11-1 and CR11-2 will close with the former holding in relay coil CR11-C and the latter closing a circuit from terminal 37 to clutch coils TR2-CL and TR3-CL. If the intersection controller is energizing a red signal to the cross street, L2 power is on terminal 37 from the cross street red signals, and from terminal 37 is applied to clutch coil TR2-CL through line 74, now-closed contacts CR11-2, and line 73; and also through line 75 to timer TR3 clutch coil TR3-CL. When the clutch coils are energized they reset timers TR2 and TR3 and cause closure of contacts TR2-1 and TR2-2, and TR3-1 and TR3-2. Timer TR2 does not start to time until power is removed from terminal 37 at the end of the cross street red interval. Timer TR3 does not start to time until timer TR2 times out.

Contacts TR3-1 are closed when clutch coil TR3-CL is energized to apply L1 power over lines 94 and 95 to the vehicle detector relay coil CR9-C closing its contacts CR9-1, CR9-2 and CR9-3. Contacts CR9-1 hold relay coil CR9-C energized with L1 power arriving at terminal 40 at all times except during the cross street green interval.

Contacts CR9-2 transfer L2 power from line 60 through lines 99 and 98 to the normally open contact of contact set CR10-1. During coordinated operation this has no effect because the contact is always open. Its effect during non-coordinated operation is explained in the next section.

Contacts CR9-3 close and complete the circuit between terminals 42 and 43 through lines 84 and 88. This permits L2 power to flow to the split dial motor through the pair of contacts closed by the amber dial with the arrival of the dial key which terminates the main street allotted green interval. The controller is thereby caused to insert a cross street green interval at the allotted time. The function of contacts CR9–3 and the split dial and amber dial will be explained more fully in connection with FIGURE 7.

When power is applied to terminal 46 at the beginning of the cross street green interval, timer TR2 motor M is energized through now-closed contacts TR2–2. Relay coil CR8–C is also energized through now-closed contacts TR2–1. Contacts CR8–2 open and break the holding circuit to the pedestrian detector memory relay coil CR11–C. Contacts CR11–1 and CR11–2 open. The latter contacts break the circuit to timer clutch coils TR2–CL and TR3–CL but nothing happens because the coils are already de-energized. Contacts CR8–1 transfer and remove power from the wait signals 7 and apply power to the walk signals 6 through terminal 34. The circuit includes line L2, line 85, now-transferred contacts CR8–1, terminal 34, line 86, walk signals 6, line 87, and line L1. The walk interval is thus timing and the walk signals 6 are illuminated.

The walk interval is terminated when timer TR2 times out. Contacts TR2–1 transfer to the position shown in FIGURE 5 and de-energize transfer relay coil CR8–C. Contacts CR8–1 transfer back to the position shown in FIGURE 5 and de-energize the walk signals 6 and energize the wait signals 7 through terminal 33, line 89, and line 90.

When contacts TR2–1 transfer to the position shown in FIGURE 5 they energize timer TR3 motor M through line 91, now-closed contacts TR3–2, line 92, motor M, line 93, and line L1. Contacts TR3–2 were closed when the pedestrian pushbutton was depressed. The guaranteed pedestrian clearance interval is thus timing. If the sum of the intervals set on timers T2, T3, and T1 is greater than the minimum interval set on the amber dial, the amber dial stops, as explained more fully in connection with FIGURE 7.

Contacts TR3–1 were also closed when the pedestrian pushbutton PB was depressed and remain closed supplying L1 power to hold in the vehicle detector relay coil CR9–C. The circuit includes line L1, line 94, contacts TR3–1, line 95, and vehicle detector relay coil CR9–C. Contacts CR9–2 remain transferred and continue to hold open the power circuit to timer TR1 clutch coil TR1–CL. This mechanically prevents timer TR1 from timing even though its motor M is energized from terminal 46. Timer TR1 thus cannot time because its clutch is de-energized.

When timer TR3 times out, the guaranteed pedestrian clearance interval is ended and the intersection controller may resume control of the intersection. Contacts TR3–1 open and de-energize the vehicle detector relay coil CR9–C. Contacts CR9–2 transfer to the position shown in FIGURE 5. Timer TR1 clutch coil TR1–CL is energized and timer TR1 starts timing. At the end of the interval which is normally set for three to five seconds contacts TR1–1 close and supply L2 power to terminal 41 and thence to the amber dial motor in the intersection controller. The dial will start and almost immediately energize the ratchet solenoid to rotate the camshaft to the cross street amber interval and then to the main street green interval. Thus a pedestrian movement has been inserted into the cycle.

*Non-coordinated movement*

The difference between coordinated and non-coordinated action is that in the former the cross street portion of the cycle may be called in only at times not injurious to main street progression and in the latter may be called in at any time after the main street has been given a minimum right of way interval after the previous cross street period.

Relay CR10 shown near the bottom of FIGURE 5 serves as a coordinating or non-coordinated device. An intersection controller which is coordinated is defined as one which operates in a system in timed relationship with other controllers in the system. The intersection controller described herein may be so defined. If the controller is always to operate coordinated with the master controller, no power need be supplied to terminal 49. When relay CR10–C is not energized, its contacts CR10–1 remain in the position shown in FIGURE 5 and furnish a continuous circuit between terminals 38 and 45. Terminal 45 is supplied with variable frequency power by an amplifier unit within the intersection controller cabinet and terminal 38 applies it to the variable speed split dial motor VM in the intersection controller. Thus, the split dial motor is supplied with power continuously and operates continuously.

During certain portions of the day or night, however, traffic may be light and it may be desired to free the controller of coordination. When traffic volume is low, L2 power may be applied to terminal 49 by the master controller over an interconnecting circuit. Relay coil CR10–C is energized and contacts CR10–1 transfer. Power to terminal 38 and the split dial motor VM is now derived from terminal 44 over lines 98 and 96. Power is supplied to terminal 44 by the intersection controller continuously until the front key 100 on the split dial 202 opens a pair of contacts 100S at the end of each traffic actuated cycle. When the contacts open at the end of each traffic actuated cycle, L2 power is removed from the split dial motor and the dial comes to rest until the next traffic actuated cycle. Thus, the controller dwells with the right of way signals illuminated to main street and will time a cross street movement upon vehicle or pedestrian actuation.

When a traffic actuation occurs, vehicle detector relay coil CR9–C is energized and contacts CR9–2 transfer. L2 power is applied to the split dial motor through line 60, now-transferred contacts CR9–2, line 99, line 98, now-transferred contacts CR10–1, line 96, and terminal 38. As soon as the motor turns the split dial a few degrees the front key on the split dial moves away and permits the contacts to close and supply power to terminal 44. L2 power thus continues to be supplied to the split dial motor through terminal 44, line 98, contacts CR10–1, line 96, and terminal 38. This permits the split dial to make one revolution and time the cross street right of way period. The dial times the cross street maximum period and the step switch illuminates the right of way signals for only the minimum time required by vehicle actuation as timed by the amber dial and/or timer TR1.

It is to be noted that the split dial motor is energized from standard 60 cycle alternating current during non-coordinated operation. That is, the split dial motor no longer receives power over line 120 from the variable frequency amplifier unit in the intersection controller cabinet. The variable frequency is normally provided to establish the various traffic cycle durations and is not necessary for non-coordinated operation. Likewise, during failure of the variable frequency source the split dial is transferred to standard 60 cycle power.

*Maximum cross street interval*

The maximum time that continuously arriving vehicles can hold the right of way on the cross street is controlled by the maximum cross street timing circuit. Cross street traffic can hold the right of way thereon until the split controlling dial transfers the right of way to main street.

One feature of the present invention is the variable duration of the cross street maximum interval which is made to change with traffic volume in the entire system. As noted previously, the traffic sampling master controller selects the optimum split of the traffic cycle dependent on the ratio of the volume of main street traffic to cross street traffic. Another version of the master controller may select the optimum split according to the ratio of the volumes of traffic in the heavier direction on main street to the heavier direction on cross street. Regardless of the method used, the proper split is effected at the local controllers by making effective one of a group of split keys. The split keys at each intersection controller need not be inserted in the split dial at exactly the same point as at other intersections but may be inserted at points conforming more exactly to the ratio of traffic volumes at each particular intersection. For most perfect progression, however, the keys for each split would be set at or near the same percentage in each controller.

Referring again to FIGURE 5, relay CR12 shown near the top of the drawing is termed the cross street maximum relay. It is momentarily energized once each traffic signal cycle when the effective split key closes its contact pair providing the amber timing dial has stopped with contacts 135S closed. L2 power is momentarily applied to terminal 48 by the effective split control contacts in the intersection controller thus energizing cross street maximum relay coil CR12–C. Contacts CR12–1 transfer and remove L1 power from terminal 47 and apply L1 power to terminal 39. Removal of L1 power from terminal 47 of the auxiliary unit results in removal of power from terminal 47 of the intersection controller. This de-energizes the transfer relay 170 in the controller which permits the transfer contacts 170S to close and energize the amber dial motor. The amber dial starts to time the cross street clearing interval and then to transfer right of way to the main street in time for progression. The operation of the intersection controller is described more fully in the next section.

When contacts CR12–1 transfer and apply L1 power to terminal 39, a vehicle actuation is simulated. Power flows from the low voltage winding 53, through lines 54, 64, detector relay coil CR9–C, line 65, now-transferred contacts CR12–1, to line L1. Detector relay memory contacts CR9–1 close and apply L1 power from terminal 40 to the detector relay coil CR9–C. L1 power is available at terminal 40 because the now de-energized transfer relay in the intersection controller has permitted the amber dial to start and to energize the camshaft out of the cross street green interval. Terminal 40 is energized with L1 power in all intervals except the cross street green interval. The detector memory circuit is thus complete again and remembers the simulated call until the next cycle.

Almost simultaneously with the energization of the cross street maximum relay, the amber dial within the intersection controller energizes the camshaft ratchet solenoid which moves the camshaft out of the cross street green interval and into the cross street amber interval, as explained above. After timing the amber interval the amber dial again energizes the ratchet solenoid which moves the camshaft into the main street right of way interval.

Thus, operation of the effective split key during continued actuation or timing of the cross street interval causes retransfer to the main street interval in time for progression, and also closes the detector memory relay circuits to cause the controller to insert a cross street interval during the following cycle. This is termed the recall and memory feature.

*Intersection controller function*

Before explaining the operation of the preferred form of intersection controller a short description of its function is in order. FIGURE 6 shows in symbolic form the split and cycle length timing dial, and the constant interval timing dial. For convenience these are called the split dial and the amber dial and may be of the type shown in Patent 2,815,410 issued to Frank Arthur Pearson et al., Dec. 3, 1957.

The split dial 202 controls three functions: cycle length, split, and offset. It controls the duration of the cycle because it is driven by a variable speed motor. The variable speed motor is controlled by the master controller through a variable frequency source, an interconnecting channel, and an amplifier located in the local controller cabinet.

It controls the division of the cycle according to the split established by the master controller. As dial 202 rotates it causes alternately the termination of the main street minimum interval and the cross street maximum interval. Four choices of split are available, with provision for presetting each split at any of 100 divisions of the cycle.

The split dial 202, in combination with a zero reference or resynchronizing cam, also keeps the local controller in time with the master controller. In combination with any one of the group of offset dials shown in United States patent application 768,193 it maintains a precise offset relationship with the cycle established by the master controller.

The split dial 202 effects control of the division of the cycle between main street and cross street by timing, alternately, the termination of the main street green interval and then the cross street green interval. Key 100 closes contacts 100S to start the termination of the main street minimum green interval. One of the keys 101, 101', 102, or 103 closes contacts 101S, 101S', 102S, or 103S, respectively, to start the termination of the maximum cross street green interval. Which of the latter keys and contacts pairs is effective is determined by the master controller.

The actual termination of the respective intervals is accomplished by the amber dial 203 which energizes a step switch solenoid to move the step switch from one interval to the next.

A cycle of operation will now be described. Assume, for example, that the system is operating in coordination with the master controller and that no traffic actuation has recently occurred on the cross street. The amber dial 203 is stopped with key 132 holding open contacts 132S thereby de-energizing its drive motor. Contacts operated by the step switch camshaft (not shown) energize the main street green and the cross street red signals. The split dial 202 is rotating in synchronism with the master controller. None of its contacts is effective to start the amber timing dial through a half revolution because the pedestrian and vehicle actuated circuits are open.

Assume now that a unit of traffic arrives on the cross street and actuates the detector. The detector memory relay circuit is energized and holds itself in until key 100 closes contacts 100S which bridge around contacts 132S. The amber dial motor is energized and starts to rotate the amber dial 203 clockwise. Key 132 moves away from contacts 132S allowing them to close and maintain the motor energized. Release key 131 momentarily closes contacts 131S and energizes the step switch solenoid. The solenoid turns the camshaft one step which de-energizes the main street green signal and energizes the main street amber signal. With the continued rotation of dial 203 key 174 momentarily closes contacts 130S and again energizes the step switch solenoid. The camshaft is turned one step and de-energizes the main street amber signal and the cross street red signal and energizes the main street red signal and the cross street green signal. Dial 203 rotates until stop key 133 opens contacts 133S and de-energizes the motor circuit.

If no further traffic actuations occur, the timer within the auxiliary unit times out and supplies power to the dial motor from a camshaft controlled contact closed during the cross street green interval. Dial 203 rotates and key 178 closes contacts 130S momentarily to energize the step switch solenoid. The step switch energizes the cross street amber signal and de-energizes the cross street green signal. A short time later key 180 momentarily closes contacts 130S to again energize the step switch solenoid. The cross street amber signal is de-energized and the main street green signal is energized. Dial 203 rotates until stop key 132 opens contacts 132S and de-energizes the motor.

If additional units of traffic had arrived on the cross street and actuated the detector during the cross street green interval, they would have reset the timer 21 and caused an extension of the cross street green interval.

They could not have held the right of way past the split demanded by the master controller. Closure of the effective one of the split control contacts 101S, 101S', 102S, or 103S would have caused the de-energization of a transfer relay and the energization of the amber dial motor. The amber dial 203 would have caused the transfer of right of way back to the main street in time for progression. The detector memory circuit would have been closed to call in the cross street interval during the next cycle.

The operation of the intersection controller will be described more fully in the following section.

Intersection controller

The circuit diagram for the type of local intersection controller described above and which has been adapted for use as a coordinated semi-actuated controller in connection with a pedestrian and vehicle actuated timer unit of the present invention is shown in FIGURE 7. This drawing is almost identical with FIGURE 7 of United States patent application 642,469, entitled Multiple Program Traffic Control System.

The numerical designations used in FIGURE 7 of the present application are similar to those used in the prior application except that 100 has been added to each numeral except those already in the hundreds. This is necessary because the lower numerals were already used in the present application, and to avoid confusion with the prior application.

Since the filing of patent application 642,469 several improvements have been made to the original unit to increase its flexibility. These improvements are shown in patent application 742,160 and consist of the addition of a fourth split, and the elimination of duplicate switches 104S–106S.

The fourth split choice is shown in FIGURE 7 as cam actuated contacts 101S'. The duplicate contacts 104S–106S have been eliminated because the split control cams have been changed to keys. Two keys may be provided rather than one. The extra keys permit easy conversion of the intersection controller from two phase operation to three phase operation.

The permit the intersection controller shown in patent application 642,469 to be utilized with the present invention it is necessary that several minor changes be made in the circuit and in the cam actuated contacts. It is contemplated that the changes which can be made economically in the standardly produced controller be included at the time of production. Wiring changes, and contact changes which may have substantial cost, will not be made to the standard non-actuated controller. They will be made at customer request to convert the standard controller to semiactuated operation.

A change which can be made most economically to the standard intersection controller consists of the addition of a fifth key 135 and contacts 135S near the rear of the constant interval timing dial 203. Contacts 135S are connected in series with terminal 48 and line 158' which is connected in common with one contact of each pair of split control contacts 101S, 101S', 102S, and 103S. Its purpose is to energize the cross street maximum relay coil CR12–C shown in FIGURE 5 and explained above.

A change which can be made economically only to each intersection controller adapted for semi-actuated use consists of converting the single pole single throw cam actuated contacts 100S to double throw contacts to enable the split dial 203 to start the termination of the main street green interval at the proper point in the cycle after a vehicle detector actuation has occurred. This addition is necessary to permit the intersection controller to operate as a semi-actuated controller.

Key 100 is in the preferred form of the invention a key having a long trailing edge or a plurality of such keys. It is necessary that the key which operates contacts 100S be broad so that contacts 100S are actuated for an extended interval. This permits an actuated cycle to start some time after the zero point in the cycle and permits a cross street vehicle to obtain right of way if it arrives late in the allotted cross street interval.

The adjustment of the intersection controller by the master controller will not be described here because it is adequately described in patent application 642,469, mentioned above. Its operation controlled by the pedestrian and vehicle actuated auxiliary unit will be described in the following section.

Semi-actuated operation

Assume that the intersection controller shown in FIGURES 6 and 7 is connected to both a master controller and a pedestrian and vehicle actuable auxiliary timer unit. The traffic adjusted master controller adjusts the cycle length, split, and offset of the traffic signal cycle originated by the intersection controller. The master controller effects the adjustment over interconnecting conductors 120–125 in a manner described in patent application 642,469.

The auxiliary timer unit adjusts the duration of the cross street interval and the clearance interval and the walk-wait signal intervals. The combination of master, local, and auxiliary controllers is designed to give the utmost control in a coordinated, traffic actuated system. The auxiliary unit is connected to the intersection controller through a multi-conductor harness.

Referring more specifically to FIGURE 7, ratchet solenoid 148 controls the stepping of the camshaft (not shown) which in turn controls the energization and de-energization of the intersection traffic signals through the cycle of signal change. One lead of ratchet solenoid 148 is connected directly to line L1. Its other lead is connected to line L2 through line 173, impulse contacts 130S, and camshaft operated contacts 159S. Impulse contacts 130S are closed for each change of the traffic signals. Contacts 159S are closed in all traffic intervals except the main street green interval. During the main street green interval, contacts 159S are opened by their control cam (not shown) disabling the circuit through impulse contacts 130S. Release contacts 131S bridge contacts 130S and 159S and provide L2 power to ratchet solenoid 148 to release the camshaft from the main street green interval.

Contacts 130S and 131S are actuated by keys 174, 178, 180, and 131 on the amber timing dial 203. The amber timing dial 203 is capable of timing any of the constant duration traffic signal intervals. These include clearance intervals, pedestrian clearance intervals, delayed green intervals, or other constant duration intervals. Keys similar to 174 would be inserted for each additional interval, and the cams on the camshaft would be cut accordingly.

Key actuated contacts 132S, 133S, and 135S are also controlled and actuated by keys 132, 133, and 135, respectively, inserted in the amber timing dial 203. The amber timing dial is driven intermittently by a fixed speed motor 137 which has one lead connected directly to line L1. The other lead is connected to line L2 through line 138 and transfer relay contacts 170S and alternately through key actuated contacts 132S and 133S. During the latter portion of the main street green interval the circuit to the amber timing dial motor 137 includes line L2, contacts 132S, line 177, transfer relay contacts 170S, and line 138. During the latter portion of the cross street green interval the circuit to the amber timing dial motor 137 is transferred to include line L2, camshaft actuated contacts 149S, contacts 133S, line 171, transfer relay contacts 170S, and line 138.

The transfer between the above two circuits is effected by the transfer relay whose coil 170 is energized through line 176 and the camshaft actuated contacts 149S which are closed during the cross street green interval. The purpose of this circuit is to insure that the cross street green interval will be controlled by the first portion of the split control dial 202 and that the main street green interval will be controlled by the second portion of the split control dial 202. Otherwise the cycle may be divided opposite to the way it is desired.

The split dial 202 is driven by a synchronous motor 160 to which is applied variable frequency power from interconnecting circuit 120. Power from the variable frequency circuit 120 also energizes fail-safe relay 126 whose contacts 126S complete the circuit to motor 160. The circuit to motor 160 includes line 120, relay contacts 127S, line 161, closed contacts 126S, terminal 45, normally closed contacts CR10–1, terminal 38, and line 169. Relay contacts 127S are normally closed and open only when the resynchronizing cam (not shown) in the intersection controller is out of step with the master controller.

The resynchronizing circuit includes interconnecting channel 121, normally open contacts 167, and relay 127. Power is applied to circuit 121 during approximately 97% of the traffic cycle. It is interrupted during 3% of the cycle. Contacts 167 are closed during approximately 2% of the cycle. After the first traffic cycle the time that contacts 167 are closed corresponds to the time that channel 121 is de-energized. Thus, relay 127 is not energized and contacts 127S remain closed. If the intersection controller gets out of step with the master controller, contacts 127S open and de-energize the split dial motor 160 until the local controllers are again in step with the master. The resynchronizing time may be divided over more than one cycle by an interrupter in a manner which is well known.

During non-coordinated use, the variable frequency circuit to motor 160 is broken by contacts CR10–1 and the dial motor 160 is energized from 60 cycle power. During failure of the variable frequency channel 120 relay contacts 126S transfer to the position shown in FIGURE 7 and apply L2 power to motor 160 from line 128. Components shown dotted are located in the auxiliary unit 10.

The method of establishing the proper offset relationship between the intersection controller and the master controller will now be explained. Reversible motor 114 is adapted to rotate dial 202 in the forward or reverse direction with respect to the resynchronizing cam and to thus change its offset relationship with the master controller. Reversible motor 114 drives in one direction when it is energized through line 128 and in the opposite direction when energized through line 129. Reversing switches 116R–119R determine the direction motor 114 shall drive; their control cams are cut 50% on and 50% off and are positioned so that the motor 114 will drive dial 202 the shorter distance to the new offset.

Switches 116S–119S determine when motor 114 is to be energized. The effective switch is normally open. When the master controller determines that a new offset relationship is required, it energizes or de-energizes control channels 122 or 123. Channels 122, 123 control the energization of relay coils 113, 112, respectively. Contacts 113S and 112S are controlled by relay coils 113 and 112 and determine which offset switch 116S–119S is effective. For example, with neither channel 122 nor 123 energized, contacts 113S and 112S are in the position shown in FIGURE 7 and offset switches 119S and 119R are effective. With both channels 122 and 123 energized, offset switches 116S and 116R would be effective. With channel 122 energized, offset switches 117S and 117R would be effective. With channel 123 energized, offset switches 118S and 118R would be effective.

The function of the split control keys 101, 101′, 102 and 103 and contacts 101S, 101S′, 102S and 103S has been explained above. The circuits controlling which split control contact is effective include relay contacts 10S, 11S, and 11S′. These contacts are controlled by relays 110 and 111 which in turn are controlled by interconnecting channels 124 and 125.

When neither channel is energized split S1 is effective. The circuit includes line L2, line 181, contacts 10S, line 182, contacts 11S, line 183, contacts 103S, line 158′, contacts 135S and terminal 48. Terminal 48 is connected to terminal 48 in FIGURE 5 which controls the maximum relay coil CR12–C. Thus, if a sufficient number of vehicles has arrived on the cross street to require a maximum cross street interval, maximum relay coil CR12–C is energized when the split control contacts 103S are closed.

The master controller may put split S2 in effect by energizing channel 124. When channel 124 is energized, relay 110 is energized and contacts 10S are transferred. The circuit includes line L2, line 181, contacts 10S, line 186, contacts 11S′, and contacts 101S.

Split S3 is effective when channel 125 is energized and contacts 11S, 11S′ are transferred. The circuit includes line L2, line 181, contacts 10S, line 182, contacts 11S, line 185, and contacts 102S.

Split S4 is effective when both channels 124 and 125 are energized and relays 110 and 111 are energized. The circuit then includes line L2, line 181, transferred contacts 10S, line 186, transferred contacts 11S′ and contacts 101S′.

One of the above split control contacts determines the end of the cross street maximum green interval. Contacts 100S determine its start. Once each revolution of dial 202 contacts 100S are actuated by key 100 to close the circuit between terminal 43 and line 157′. If no detector actuation has occurred the circuit between terminals 42 and 43 is open and motor 137 is not energized. However, if a detector actuation has occurred, detector relay CR9, FIGURE 5, is energized and its contacts CR9–3 close the circuit between terminals 42 and 43. L2 power is supplied to motor 137 from line L2, through line 157′, momentarily transferred contacts 100S, terminal 43, contacts CR9–3, terminal 42, line 157, contacts 170S, and line 138. Contacts 100S almost immediately retransfer to the position shown in FIGURE 7 and break the above circuit. Contacts 132S have closed and supply a holding circuit for motor 137 through line 177, contacts 170S, and line 138. Contacts 131S close and energize the ratchet solenoid 148 which moves the camshaft to the main street amber interval. Camshaft controlled contacts 169S close and also supply power to motor 137 through line 157.

Contacts 130S close and energize the ratchet solenoid 148 which moves the camshaft to the cross street green interval. During this interval camshaft controlled contacts 149S close and energize the transfer relay 170 through line 176. Power is also supplied through contacts 149S to the split control relay release coils 110R and 111R. Any split change that has been demanded by the master controller may now go into effect when the change will not disturb the timing of the cycle. If a split change could be made at any time, a change from a later split to an earlier split may occur soon after the earlier split has passed resulting in a cross street maximum cycle one and one-half traffic cycles in duration.

When contacts 170S transfer with the beginning of the cross street green interval the source of power for motor 137 is transferred. Contacts 133S become effective to stop the amber dial motor 137 shortly before contacts 130S close. If contacts 130S were allowed to close they would energize the ratchet solenoid 148 and terminate the cross street green interval. The vehicle extension timer TR1 has control of the duration of the cross street right of way interval after the minimum interval expires and until the cross street maximum interval expires. If there are only one or a few detector actuations timer TR1 will time out before the maximum period has expired. Contacts TR1–1, FIGURE 5, will close and complete the circuit between terminals 41 and 46. L2 power then flows to motor 137 to start the termination of the cross street right of way interval. The circuit includes line L2, contacts 149S, terminal 46, contacts TR1–1, terminal 41, line 158, transferred contacts 170S, line 138, and motor 137.

If a large number of traffic actuations had occurred, contacts 135S would have closed making the effective pair of the split control contacts 101S, 101S', 102S, or 103S active. Assuming that split S1 is in effect, when split control contacts 103S are closed a circuit is established to maximum relay coil CR12–C, FIGURE 5, through line L2, line 181, contacts 10S, line 182, contacts 11S, line 183, contacts 103S, line 158', contacts 135S, and terminal 48, all in FIGURE 7. Contacts CR12–1, FIGURE 5, remove L1 power from terminal 47. Transfer relay 170 is thus de-energized and contacts 170S transfer to the position shown in FIGURE 7.

When contacts 170S transfer they establish a circuit to amber dial motor 137 through contacts 132S which are closed. Contacts 130S close almost immediately and energize the ratchet solenoid 148 which steps the camshaft into the cross street amber interval. Contacts 169S open but have no effect.

The amber dial 203 times the duration of the cross street amber interval and then closes contacts 130S to ratchet the camshaft into the main street green interval. The cycle is complete. However, when the split control contact 103S energized the maximum relay CR12, contacts CR12–1 transferred L1 power to the detector circuit and simulated a vehicle call. Thus, the detector relay memory circuit is closed and another cycle of cross street right of way will be inserted after the main street minimum interval.

During non-coordinated operation the apparatus responds similarly except that it is able to answer calls almost immediately after actuation if the main street minimum interval has expired. For non-coordinated or free operation relay coil CR10 is energized. Contacts CR10–1 transfer the variable speed motor 160 from the variable frequency source to 60 cycle power at terminal 44. Terminal 44 is normally de-energized causing the split dial motor 160 to dwell at the point where key 100 transfers contacts 100S to the position shown by a broken line in FIGURE 7. Contacts 100S thus interrupt the holding circuit and cause motor 160 to dwell.

When a detector actuation occurs, detector relay contacts CR9–2 and CR9–3, FIGURE 5, close. Contacts CR9–3 close the circuit between terminals 42 and 43 and complete the L2 circuit to the amber dial motor 137. The circuit includes line L2, line 157', transferred contacts 100S, terminal 43, contacts CR9–3, terminal 42, line 157, contacts 170S, line 138, and motor 137.

The split dial motor 160 is energized over the circuit shown in FIGURE 5 which consists of line L2, line 60, contacts CR9–2, lines 99 and 98, now-transferred contacts CR10–1, line 96, and terminal 38. The remainder of the circuit is shown in FIGURE 7 and consists of terminal 38, line 169 and motor 160. As soon as motor 160 rotates the split dial 202 a few degrees, contacts 100S transfer to the position shown in FIGURE 7. L2 power is thereby supplied to motor 160 for one revolution of dial 202 until contacts 100S again interrupt the circuit. Meanwhile, the amber dial and the timers time the various intervals in the traffic cycle.

Thus, the combination consisting of a traffic adjusted master controller, a highly flexible intersection controller, and an auxiliary timing and control unit provides a pattern of signal intervals timed to meet the demands of vehicular and pedestrian traffic at each intersection as well as within the entire system.

The principal facility of the invention is its ability to provide, within the framework of a multiplicity of patterns of operation established by the master local controller combination, a minimum vehicle interval upon a single detector actuation, one or more extension intervals upon repeated actuation, and a maximum cross street interval upon continued actuation. The maximum interval is adjustable in accurate relationship with the split of the cycle. Also, a vehicle arriving on the cross street some time after the beginning of the cross street allotted interval may still obtain right of way without disturbing progression on the main street.

It is appreciated that a great number of changes could be made in the circuit configuration without departing from the spirit of the invention which is set forth in the appended claims.

I claim:

1. In a traffic control system including a master controller and a plurality of local controllers at least partially controlled thereby, said master controller providing cycle length, offset and split determining signals;

the improvement wherein each local controller is a semi-actuated local controller for normally allocating right of way to main street traffic movement and denying right of way to intersecting cross street traffic movement in the absence of detection of cross street traffic intending movement through the intersection, said local controller serving during each traffic cycle to allot a maximum potential cross street right of way interval and a minimum main street right of way interval and comprising:

first means responsive to said cycle length detemining signals for changing the duration of the cycle length of said traffic cycle;

second means responsive to said offset determining signals for changing the offset relationship of said traffic cycle of said local controller relative to said master controller; and, third means independent from said first and second means and responsive to said split determining signals for changing the split between said minimum main street right of way interval and said allotted maximum potential cross street right of way interval, whereby the duration of said allotted maximum cross street potential right of way interval is changed in accordance with a said changed split of the traffic cycle independently of changes in the duration or the cycle length of changes in the offset relationship.

2. In a semi-actuated local traffic controller for normally allocating right of way to main street traffic movement and denying right of way to intersecting cross street traffic movement in the absence of detection of cross street traffic intending movement through the intersection, and including:

means for timing the cycle length of operation of said controller with each traffic cycle including a maximum potential cross street allotted interval and a minimum main street allotted interval;

means for terminating said potential cross street allotted interval once each traffic cycle;

detection means energized in response to detection of cross street traffic intending movement through said intersection;

holding means responsive to energization of said detection means for maintaining energization thereof when said energization occurs during said main street allotted interval;

first switching means closed in response to energization of said detection means;

second switching means normally closed once each traffic cycle for starting said potential cross street allotted interval whereupon said holding means will become disabled;

means energized in response to a concurrent closed condition of both said first and second switching means for terminating said main street right of way interval and allocating a cross street right of way interval within said maximum potential cross street allotted interval; and, means for providing an extended period during each traffic cycle that said second switching means is closed, whereby cross street traffic detected during said extended period and after the starting of said allotted potential cross street interval may be allocated a right of way interval during said allotted potential cross street interval.

3. In a semi-actuated local traffic controller as set forth in claim 2 wherein said second switching means includes a switch contact, a rotating dial which completes one revolution per traffic cycle, a switch actuating key mounted on said dial for engagement with said switch contact once each traffic cycle, said extendable means including a plurality of said keys for extending the period of engagement with and closure of said switch contact during each traffic cycle.

4. In a semi-actuated local traffic controller as set forth in claim 2 wherein said second switching means includes a switch contact, a rotating dial which completes one revolution per traffic cycle, a switch actuating key mounted on said dial for engagement with said switch contact once each traffic cycle, said extendable means including an elongated trailing key edge portion of said key for extending the period of engagement with said switch contact during each traffic cycle.

References Cited
UNITED STATES PATENTS

| | | | |
|---|---|---|---|
| 2,908,891 | 10/1959 | Cass | 340—37 |
| 3,056,946 | 10/1962 | Brockett | 340—35 |
| 3,128,446 | 4/1964 | Barker | 340—35 |
| 3,120,651 | 2/1964 | Hendricks | 340—35 |

THOMAS B. HABECKER, *Primary Examiner.*